United States Patent [19]

Kyrtsos et al.

[11] Patent Number: 4,919,222
[45] Date of Patent: Apr. 24, 1990

[54] DYNAMIC PAYLOAD MONITOR

[75] Inventors: Christos T. Kyrtsos; Dean A. Worrell, both of Peoria, Ill.

[73] Assignee: Caterpillar Inc., Peoria, Ill.

[21] Appl. No.: 324,517

[22] Filed: Mar. 15, 1989

[51] Int. Cl.⁵ .................... G01G 19/08; G01G 19/10; G01G 19/40

[52] U.S. Cl. .................................. 177/139; 177/141; 177/25.14

[58] Field of Search ............... 177/139, 141, 146, 147, 177/25.14

[56] References Cited

U.S. PATENT DOCUMENTS

| | | | |
|---|---|---|---|
| 3,913,690 | 10/1975 | Hutchings et al. | 177/147 X |
| 4,039,084 | 8/1977 | Shinohara et al. | 177/146 X |
| 4,055,255 | 10/1977 | Vasquez . | |
| 4,230,196 | 10/1980 | Snead | 177/141 |
| 4,390,075 | 6/1983 | Snead . | |
| 4,511,974 | 4/1985 | Nakane et al. . | |
| 4,588,038 | 5/1986 | Takagi . | |
| 4,677,579 | 6/1987 | Radomilovich . | |

FOREIGN PATENT DOCUMENTS 0129422 12/1984 European Pat. Off. ......... 177/25.14

Primary Examiner—George H. Miller, Jr.
Attorney, Agent, or Firm—Wei Wei Jeang; Stephen L. Noe

[57] ABSTRACT

A dynamic payload monitor measures and displays payload weight for a loader vehicle by sensing the hydraulic pressure and position of the lift arm cylinders. The payload weight is computed by curve fitting the sensed cylinder pressure and position data to a second order polynomial, and then performing interpolation or extrapolation with a pair of pressure versus position reference parabolas obtained during calibration. The weight computation algorithms used in the dynamic payload monitor are applicable to a number of work vehicles having at least one work implement linkage and at least one hydraulic cylinder for modifying the linkage geometry.

20 Claims, 5 Drawing Sheets

DYNAMIC PAYLOAD MONITOR

TECHNICAL FIELD

This invention relates generally to vehicles for transferring bulk material and, more particularly, to an apparatus and method for weighing and indicating the weight of the bulk material being transferred.

BACKGROUND ART

Vehicles such as loaders are used generally to transfer bulk material from a stock pile onto transport vehicles such as trucks or railroad cars. In such vehicle loading applications, it is desirable that the transport vehicles are loaded to, but not over, their maximum rated legal capacity. Underloading causes inefficiency in the material hauling cycle and underutilization of the transport vehicles. Overloading causes additional maintenance cost and extra wear on the truck tires and suspension system. Furthermore, the overloaded material may need to be unloaded to decrease load weight, causing additional expense.

Payload measurement is also desirable as a measure of the material hauling operation productivity. The ability to accumulate the weight of the material loaded during a single shift, during a twenty-four hour period, or during any other time period is valuable to an operations manager.

A number of payload measuring devices have been developed. One such device is described in U.S. Pat. No. 4,230,196, issued to Snead on Oct. 28, 1980. Snead discloses a load weighing and accumulating system for a loader. Snead's device includes a pressure sensor for detecting the hydraulic pressure in the lift cylinder of the loader, and a lift arm alignment member which provides a visual aid to the operator to facilitate positioning the lift arm at a predetermined weighing location. To measure the load in the loader bucket, the operator positions the lift arm by visually aligning the alignment members on the lift arm and the vehicle frame. Following a time delay, the load is weighed.

This device has several disadvantages. The amount of data sampled in one-half second is small and results in inaccurate measurements. This is especially significant when the vehicle is operating over rough terrain. The lift cylinder pressure rises when the vehicle hits a bump, and drops when the vehicle experiences "free fall" as it clears the bump. The same sharp pressure deviations occur when the vehicle encounters a surface depression, except the pressure first decreases then increases.

In a typical loader operation environment, the ground surface is uneven. The Snead device requires that the vehicle dynamics be at a steady state when the data sampling is taking place, which is not possible when the vehicle is traveling. Weighing accuracy is severely compromised because of the small data sampling window. The Snead device also requires that the operator maintain the position of the lift arm while measurement is taking place. This requirement has two implications. Because the cylinder pressure can vary over a large range depending on the lift arm position, if the operator fails to align the lift arm, the resultant payload measurement may be grossly erroneous. In addition, requiring the operator to stop the lift arm and position it with the alignment members interrupts the operator's pace and disrupts the loading process.

Another device, disclosed in U.S. Pat. No. 4,055,255 issued to Vasquez on Oct. 25, 1977, describes an apparatus and method for carrying and delivering payload of a predetermined weight. The Vasquez device senses hydraulic pressure in the cylinder supporting the bucket. Because of the peculiar configuration of the vehicle implement linkage, the lift cylinder of the bucket is generally upright except when the bucket is lowered to obtain a load. Therefore, the Vasquez device is a special application payload weighing device not suitable for usage on loaders having different and more conventional linkage configurations.

The present invention is directed to overcoming one or more of the problems set forth above.

DISCLOSURE OF THE INVENTION

The invention avoids the disadvantages of known payload measurement systems and provides a payload monitor that is accurate, that does not alter or interfere with the operator's loading operation, and that is installable on existing or new loaders without linkage reconfiguration.

In one aspect of the present invention, an apparatus for dynamically measuring and indicating payload weight for a vehicle having at least one implement linkage, and at least one cylinder for modifying the linkage geometry includes a device for delivering a first signal in response to sensing the cylinder hydraulic pressure, and a device for delivering a second signal in response to sensing the linkage geometry with respect to the vehicle. Payload weight is then derived in response to the first and second signals.

In another aspect of the invention, a method for measuring and indicating payload weight for a loader vehicle having an implement linkage and at least one lift cylinder for modifying the linkage geometry is disclosed. The steps include sensing and delivering first and second signals responsive to the cylinder hydraulic pressure and the linkage geometry, respectively. The payload weight is then calculated in response to the first and second signals.

The invention also includes other features and advantages which will become apparent from a more detailed study of the drawings and specification.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
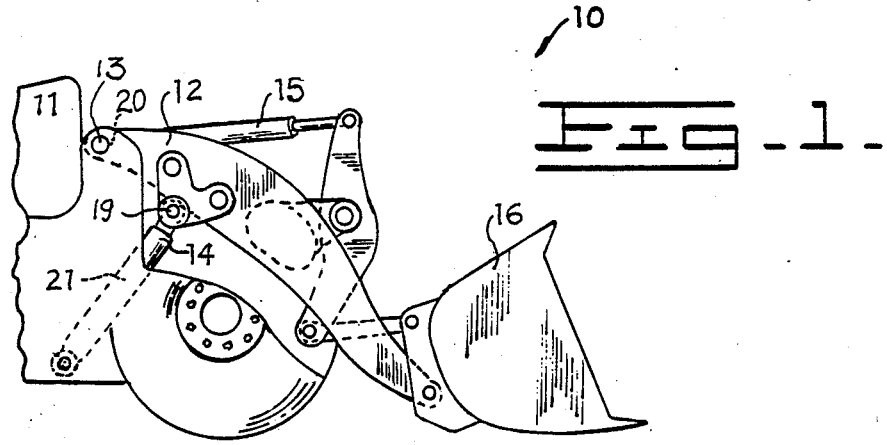
FIG. 1 is a side view of the forward portion of a loader vehicle.

In FIG. 1 a payload monitoring system is generally represented by the element number 10. Although FIG. 1 shows a forward portion of a wheel type loader vehicle 11 having a payload carrier in the form of a bucket 16, the present invention is equally applicable to vehicles such as track type loaders, and other vehicles having similar loading implements. The bucket 16 is connected to a lift arm assembly 12, which is pivotally actuated by two hydraulic lift cylinders 14 (only one of which is shown) about a pair of lift arm pivot pins 13 (only one shown) attached to the vehicle frame. A pair of lift arm load bearing pivot pins 19 (only one shown) are attached to the lift arm assembly 12 and the lift cylinders 14. The bucket 16 can also be tilted by a bucket tilt cylinder 15.

The preferred embodiment includes a rotary sensor 20 sensing the rotation of one of the lift arm pivot pins 13 from which the geometry of the lift arm assembly 12 or the extension of the lift cylinders 14 can be derived. The same rotary sensor 20 can be alternatively installed on the load bearing pivot pins 19 to provide the same information. A pressure transducer 21 senses the hydraulic pressure in one of the lift cylinders 14. Although there are two lift cylinders 14, the pressure in the cylinders is generally the same for a given payload and given lift arm assembly geometry. Thus, sensing pressure at one of the cylinders 14 is sufficient for the present application.

Figure 2:
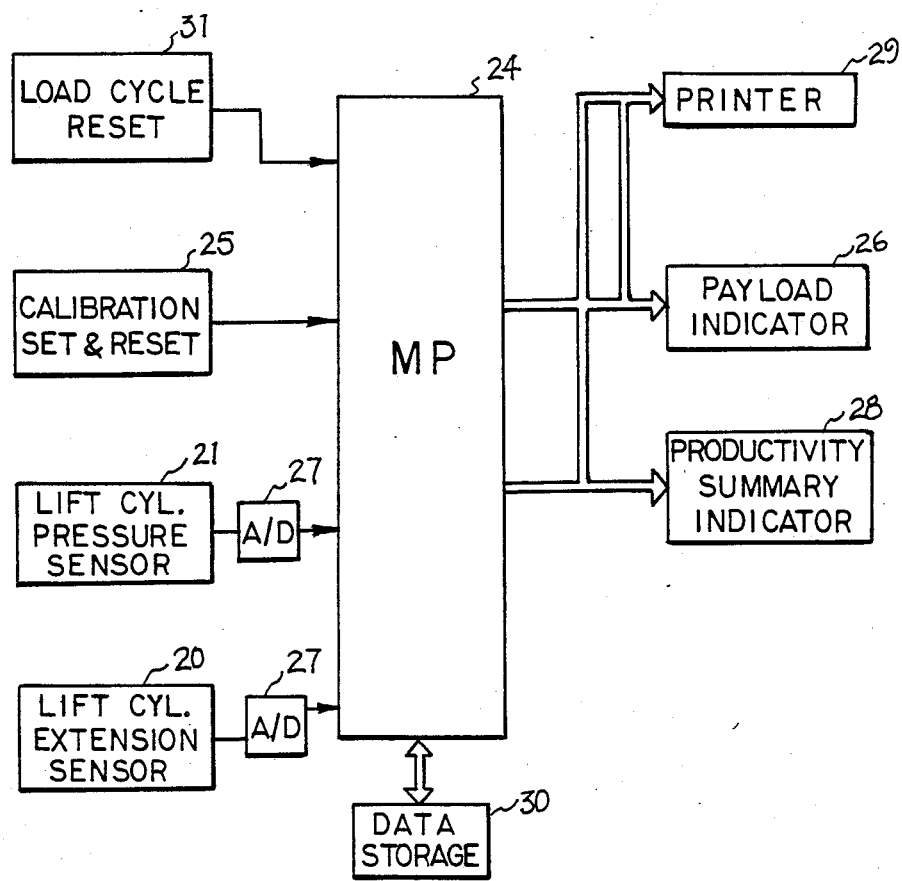
FIG. 2 is a block diagram of an embodiment of the present invention.

Referring to FIG. 2, the cylinder pressure and extension sensor signals are delivered to a microprocessor 24, after being processed by respective analog to digital (A/D) converters 27. A calibration control unit 25 enables calibration of the payload monitoring system 10. An operator can reset calibration data and enter calibration payload weight values using the calibration control unit 25. A load cycle reset control unit 31 enables the operator to indicate the beginning and end of a load cycle for a specific transporting vehicle or dump site. The calibration control 25 and the load cycle reset control 31 are preferably implemented in combination with payload weight and productivity summary indicators 26, 28, using a liquid crystal display screen (not shown) and an alphanumeric key pad (not shown). The payload weight indicator 26 displays the measured payload weight and any other weight data, such as a productivity summary of the loading operation of the loader vehicle 11. The preferred embodiment includes a printer 29 that produces hard copy reports, and capability to store information in a data storage unit 30 such as nonvolatile memory or a data disk drive.

Figure 3:
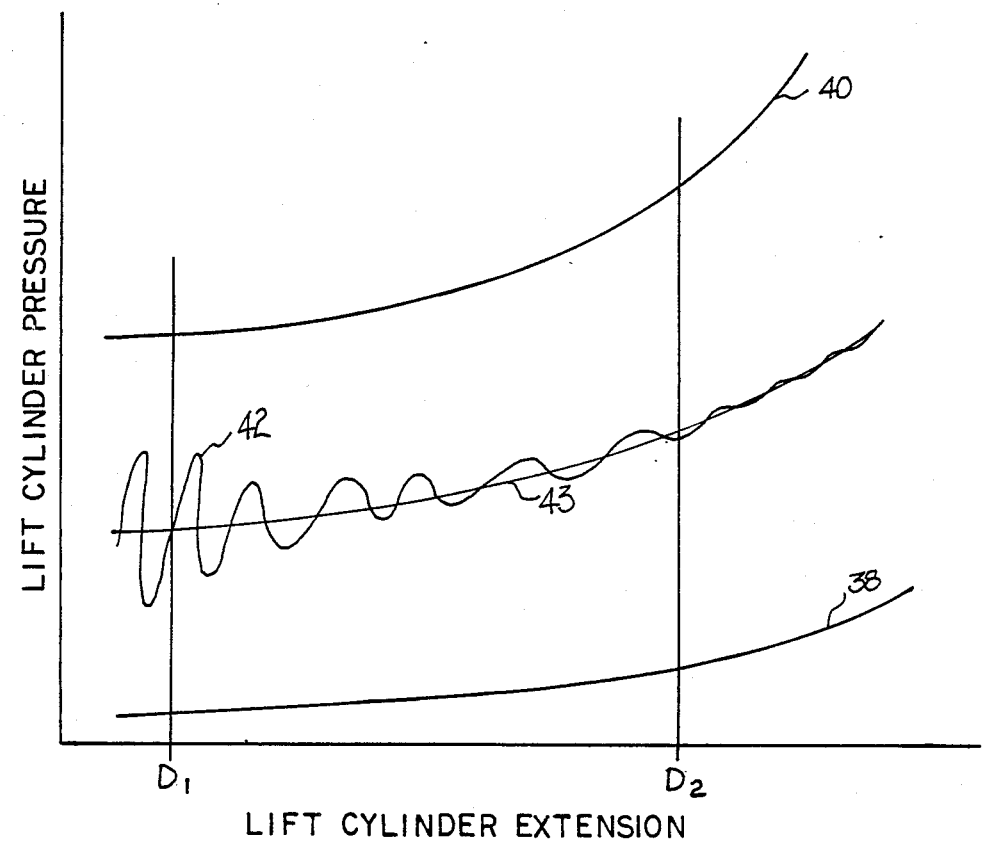
FIG. 3 is a graphical representation of cylinder pressure versus cylinder extension.

FIG. 3 graphically illustrates the relationship between cylinder pressure and cylinder extension in an embodiment of the present invention. The pressure and extension data is plotted on a graph having the lift cylinder pressure on the vertical Y-axis and the lift cylinder extension on the horizontal X-axis. A first parabolic curve 38 represents the curve fitted pressure versus extension data for an empty loader bucket 16. A second parabolic curve 40 represents the curve fitted pressure versus extension data for a payload of known weight. This known weight is preferably at or near the rated load capacity of the vehicle 11. The parabolas can be represented mathematically by second order polynomials. The curves 38,40 are sampled and stored as reference weight curves for the payload monitor system during the calibration portion (FIG. 5) of the control algorithm.

As shown in FIG. 3, the lift cylinder pressure increases as the cylinder extension increases, so that the measured weight is dependent on the geometry of the lift arm assembly 12 as the bucket 16 is being raised from the ground to dump height. Because the loader is typically digging at the beginning of a work cycle and dumping at the end of the cycle, cylinder pressure varies drastically at each end of the cycle and the dynamics of the system are unstable. Therefore, weight measurement is confined to a time period when the lift cylinder extension displacement is between D1 and D2, where $D_2 > D_1$. This ensures a set of usable sample data that accurately represents payload weight during a relatively stable portion of the work cycle. Trace 42 represents the measured load cylinder pressure versus cylinder extension. The random surges in the trace 42 denote the pressure variations in the lift cylinder during vehicle travel and directional changes.

Curve 43, which is shown superimposed over trace 42, has been curve fitted and averaged to remove the random pressure surges. The smoothed parabola 43 is an accurate representation of the pressure versus extension of the weight being measured. Experimentation has shown that lift cylinder pressure varies linearly with the weight of the payload at a particular cylinder extension for a specific lift velocity. Therefore, the payload weight can be calculated by interpolation if the curve 43 falls between the reference curves 38,40, and by extrapolation if the curve 43 is outside of the reference curves 38,40.

Figure 4:
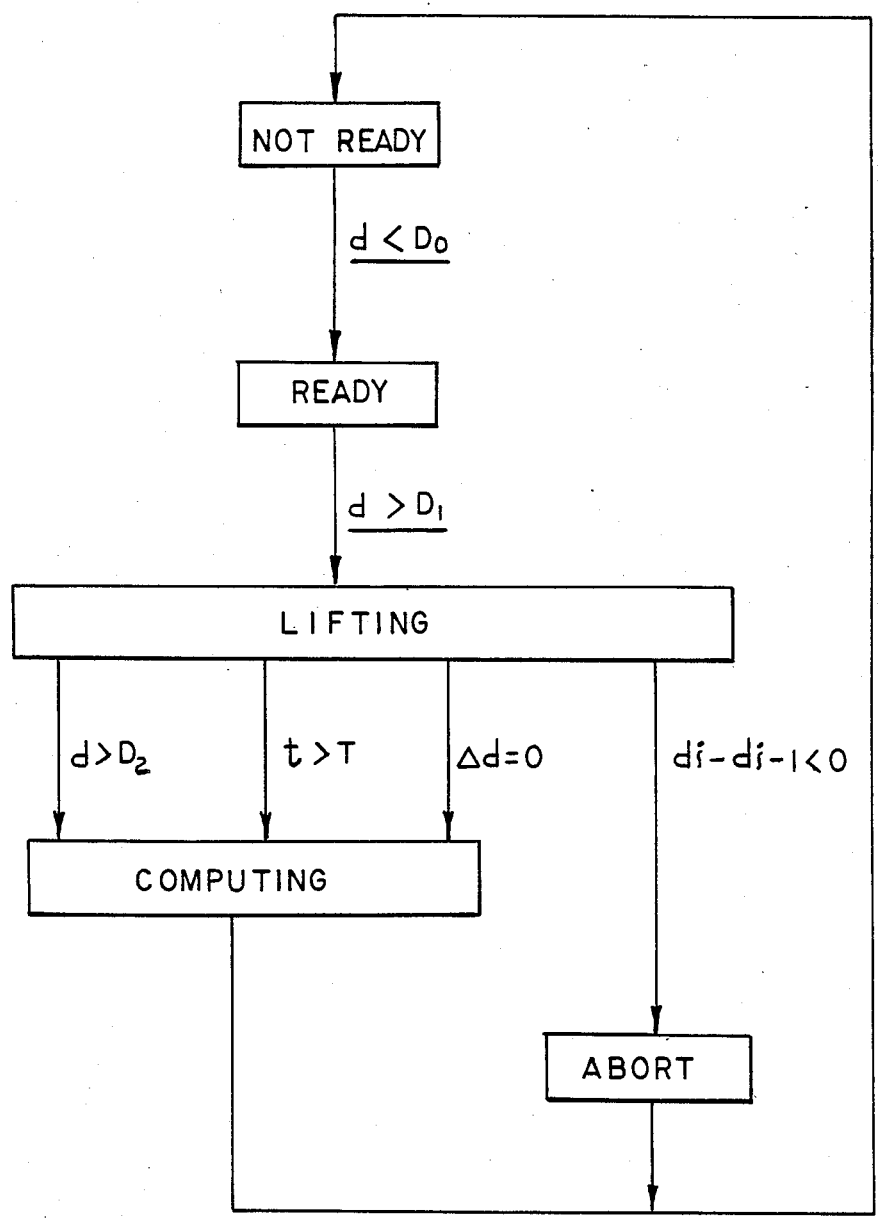
FIG. 4 is a state transition diagram of the system.

Referring to FIG. 4, a state transition diagram of the present invention is shown. The present embodiment of the payload monitor 10 makes a transition from state NOT READY to READY when the lift cylinder extension is less than a first predetermined set point $D_0$ ($d < D_0$) When the displacement (d) is less than $D_0$, the payload carrier or bucket 16 is most probably digging or crowding a pile. When the displacement is greater than another predetermined displacement set point $D_1$ ($d > D_1$), the vehicle 11 is lifting the payload carrier 16, and the present state is LIFTING. During LIFTING, cylinder pressure and position data are sampled.

Three conditions can cause state transition from LIFTING to COMPUTING. State transition occurs when cylinder extension exceeds another setpoint $D_2$ ($d > D_2$), signifying that the payload carrier has been raised and is approaching dump height. If, after T seconds, displacement $D_2$ still has not been reached ($t > T$), the system makes the same transition from LIFTING to COMPUTING. The third condition for the transition is when the cylinder displacement remains unchanged ($\Delta d = 0$). This condition denotes most load-and-carry operations where the loader vehicle 11 performs as the transport vehicle and travels to the destination with the bucket 16 held at a constant level. The payload weighing algorithm is aborted (ABORT) when the payload carrier 16 is determined to have been lowered ($d_i - d_{i-1} < 0$). The values $D_0$, $D_1$, $D_2$, and T are determined according to the specific vehicle, and can be obtained by measurement and experimentation.

Figure 5:
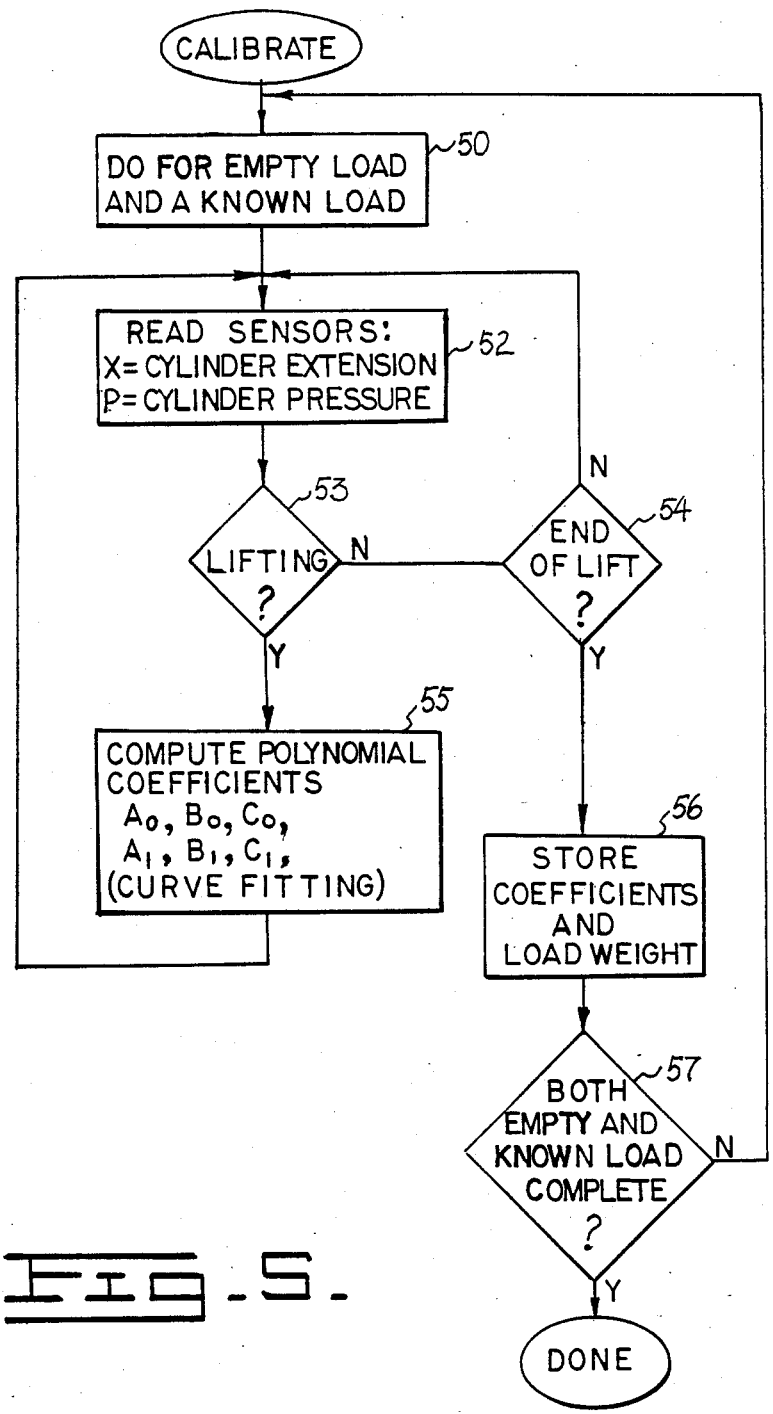
FIG. 5 is a flow chart of the calibration portion of an algorithm used in the embodiment of FIG. 2; and, FIG. 6 is a flow chart of the computation portion of an algorithm used in the embodiment of FIG. 2.

Keeping the state transition diagram of FIG. 4 in mind, reference is now made to the calibration flowchart of FIG. 5. Calibration is done sequentially with both an empty and a known load, as shown in block 50. The order in which calibration is performed is unimportant, but cylinder pressure and position data for both reference weight values must be sampled.

In block 52, the cylinder pressure and position sensors 20,21 are read. The LIFTING state flag is checked at block 53, and if the payload is being lifted, the polynomial coefficients, $A_0$, $B_0$, $C_0$, $A_1$, $B_1$, $C_1$, for that specific pressure and position sample are computed at block 55. This is the step where the sampled sensor data points are curve fitted to a second order polynomial.

If the payload is not being lifted (LIFTING flag is false), then block 54 is checked to see if END OF LIFT has occurred. The END OF LIFT flag is true if any of the conditions for state transition from LIFTING to COMPUTING is true in FIG. 4. If the END OF LIFT conditions are not met, the algorithm returns to block 52 to continue to read the sensor inputs. Otherwise, in block 56, the coefficients are stored along with the payload weight, which is either zero for an empty bucket or nonzero for a known weight. Finally, a check is made at block 57 to make certain that both empty and known payload weights are sampled before completing the calibration algorithm.

Figure 6:
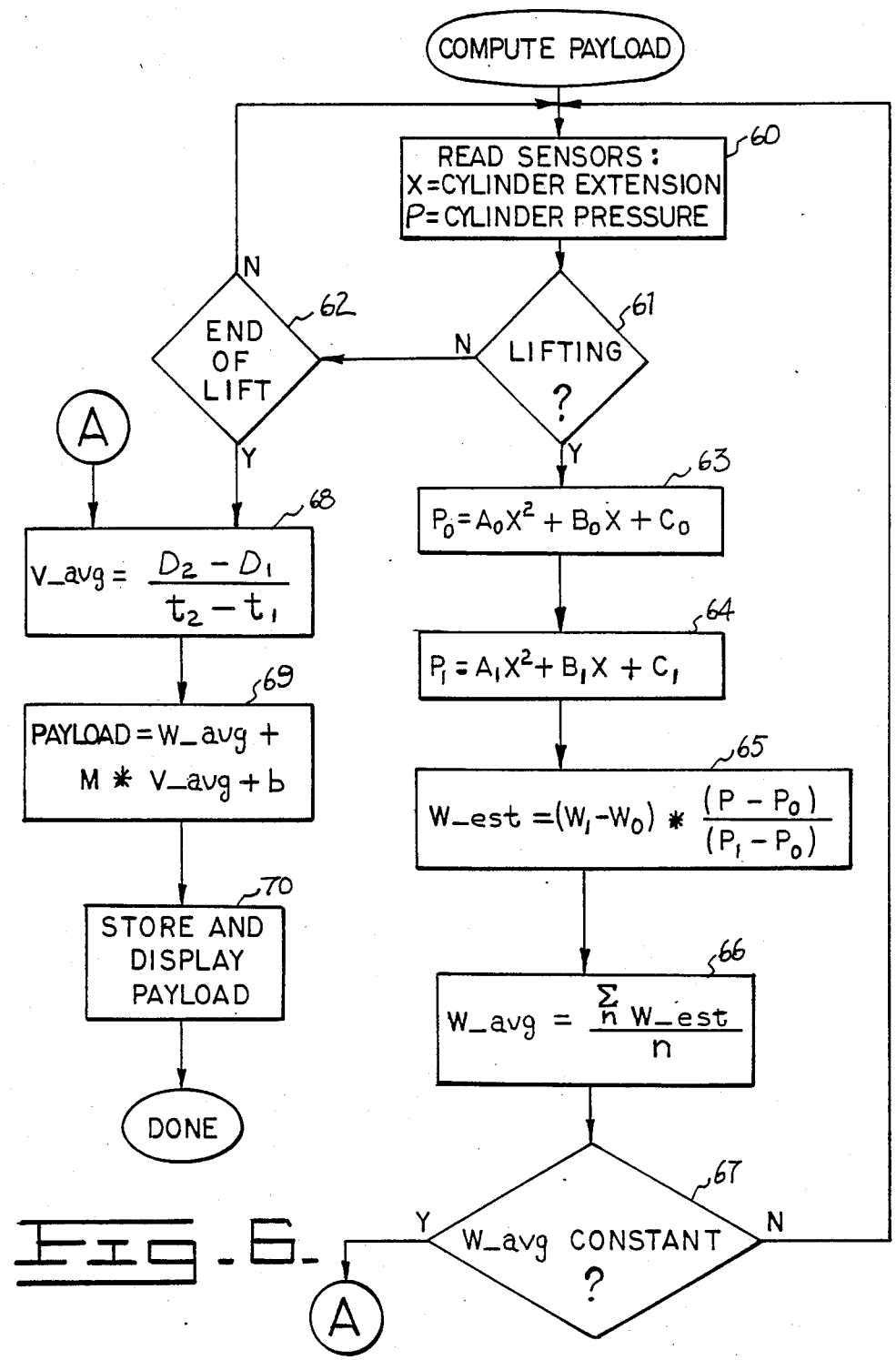

Referring next to FIG. 6, the payload weight calculation algorithm is discussed. Payload weight is calculated when the state of the system is LIFTING (refer back to FIG. 4). The work cylinder pressure and position sensors 20,21 are read in block 60. The LIFTING state flag is checked at this point in block 61. If the vehicle 11 is still lifting the payload carrier 16, the cylinder pressure $P_0$ for the empty payload carrier (zero payload weight) at that cylinder extension X is calculated in the block 63 by using coefficient values computed during calibration. Similarly, in the following block 64, the cylinder pressure $P_1$ for the known load at that cylinder extension X is computed. Next, the estimated payload weight W est is calculated in the block 65 by using the following interpolate and extrapolate formula:

$$W\ est = (W_1 - W_0) * [(P - P_0)/(P_1 - P_0)]$$

where
$W_1$ is the known payload weight,
$W_0$ is the empty payload weight,
P is the current sampled pressure,
$P_1$ is pressure for the known load, and
$P_0$ is pressure for the empty load.

All the values above are values for the measured extension X. Then an average W avg is computed for all the estimated weights W est in block 66.

If, in block 67, the average weight has remained virtually constant for a predetermined amount of time, lifting has probably ceased and there is no advantage to prolonging the sampling period. If, at block 61, it is detected that the LIFTING state flag is no longer true, then the END OF LIFT flag is checked in block 62. This flag is true if any of the conditions for state transition from LIFTING to COMPUTING is true in FIG. 4. If the end of lift conditions are not met in one of the blocks 67 or 61, the algorithm returns to block 60 to continue to read sensor inputs. Otherwise, the average lift velocity V avg is computed in block 68 by dividing the distance the cylinder 14 has extended by the amount of time it took.

As previously discussed, the cylinder pressure versus extension curves (or the payload weight derived therefrom) have a linear relationship with respect to the lift velocity, i.e. the faster the lift, the higher the payload weight value; therefore, adjustments need to be made to compensate for the linear shift. In block 69, the computed payload weight is adjusted by a value according to the computed average velocity. The values m and b in the linear equation $$m * V\ avg + b$$

are derived experimentally. Thereafter, in block 70, the computed payload value is stored and displayed. The payload values may also be used in computing productivity summaries, and may be accumulated for specific transport vehicles and dump sites.

Industrial Applicability

The operation of the present invention is best described in relation to its use in loading applications where knowledge of payload weight is important. This payload measurement system is also valuable in operations where it is desirable to monitor loader vehicle productivity.

Prior to using the payload monitor 10, the system must be calibrated. Calibration must also be repeated whenever there has been a change in the lift arm assembly configuration, such as switching to a different bucket 16 or substantial overhaul of any of the lift arm assembly subsystem. Calibration of the payload monitor 10 includes lifting the lift arm assembly 12 from ground level to dump level with an empty bucket 16, entering the payload weight, and repeating the procedure with material of a known weight in the bucket 16. Preferably, the known weight is near or at the rated capacity of the loader vehicle 11. The bucket 16 should be racked back during the lifting process to ensure that the center of gravity (C.G.) of the payload weight remains near the center of the bucket 16. The racked back bucket 16 constraint may be removed by including a position sensor in the tilt cylinder 15 to sense the degree of bucket tilt to compensate for the C.G. shift.

A typical work cycle of a loader 11 includes, sequentially: digging and/or crowding a stock pile, racking back the bucket 16 to maintain load, reversing and backing out of the pile while raising the bucket 16, traveling to a dump site or a transport vehicle while continuously raising the bucket 16, and finally dumping the load from a raised position. This loading cycle is not interrupted by the usage of the dynamic payload monitor 10, because stopping the vehicle 11 is not required and the bucket 16 is not required to be positioned at a specific height for a period of time. The operator simply resets the load cycle, enters the assigned dump vehicle or site number if such function is desired, and proceeds to load and dump following a normal work cycle. In addition, productivity summaries and hard copies of such and other payload information may be obtained from the system 10. The payload data may also be downloaded to a data disk for storage or for analysis in an office setting.

The present invention is also expandable to other vehicles with different linkage configurations by compensating for the difference thereof. Anticipated applicable vehicle types are excavators, front shovels, backhoe loaders, and any vehicles having at least one linkage with at least one hydraulic cylinder for modifying that linkage configuration. For these vehicle linkage configurations, additional pressure and position sensors may be needed to detect cylinder pressure and linkage geometry during the work cycle. However, the basic payload weight calculation remains the same, using curve fitting methods and two reference weight parabolic equations.

Other aspects, objects, and advantages of this invention can be obtained from a study of the drawings, the disclosure, and the appended claims.

We claim:

1. An apparatus for dynamically measuring and indicating payload weight for a vehicle having at least one implement linkage including a linkage connection pivot pin, and at least one cylinder for modifying said implement linkage geometry, said apparatus comprising:
  means for delivering a first signal in response to sensing the hydraulic pressure of said cylinder;
  means for delivering a second signal in response to sensing rotation of said implement linkage about said linkage connection pivot pin; and
  means for deriving payload weight in response to said first and second signals.

2. The apparatus, as set forth in claim 1, wherein said second signal represents said cylinder extension.

3. The apparatus, as set forth in claim 1, wherein said payload weight deriving means produces first and second reference payload parabolic curves, receives said first and second signals, and calculates an actual payload parabolic curve by interpolating between said first and second reference payload curves in response to said first signal value being within the area bounded by said reference payload curves, and by extrapolating beyond said first and second reference payload curves in response to said first signal value being outside of the area bounded by said reference payload curves.

4. The apparatus, as set forth in claim 3, wherein said payload weight deriving means calculates said first and second reference payload curves in response to measuring respective first and second reference payload weights.

5. The apparatus, as set forth in claim 4, wherein said vehicle includes a payload carrier, said first reference payload weight is the empty weight of said carrier and said second reference payload weight is the weight of said carrier loaded with a predetermined known mass.

6. The apparatus, as set forth in claim 3, wherein each of said payload curves is represented by a second order polynomial equation.

7. A method for dynamically measuring and indicating payload weight for a vehicle having at least one lift cylinder for elevating a payload carrier, said vehicle generally executing a work cycle including lifting said payload carrier, said method comprising the steps of:
  sensing said lift cylinder hydraulic pressure during said work cycle;
  delivering a plurality of first signals in response to said sensed pressure;
  sensing said lift cylinder extension during said work cycle;
  delivering a plurality of second signals in response to said sensed extension;
  deriving a second order polynomial geometric representation for said plurality of first and second signals;
  comparing said geometric representation to at least one other second order polynomial geometric representation of a known reference payload weight; and
  calculating an actual payload weight in response to said comparison.

8. A method, as set forth in claim 7, wherein said lift cylinder pressure and extension sensing steps are performed only during the payload lifting portion of said work cycle.

9. A method, as set forth in claim 7, wherein said polynomial is obtained by filtering said first and second signals.

10. A method, as set forth in claim 7, wherein said geometric representation of a known payload weight includes a second order polynomial derived from a plurality of first and second signals sensed during a lift of an empty payload carrier.

11. A method, as set forth in claim 10, wherein said geometric representation of a known payload weight further includes another second order polynomial derived from a plurality of first and second signals sensed during a lift of a payload carrier having a predetermined known weight.

12. A method, as set forth in claim 11, wherein said comparing step includes one of interpolation between and extrapolation beyond said empty payload carrier polynomial and said predetermined known weight payload carrier polynomial.

13. A method, as set forth in claim 12, wherein said comparing step interpolates between said empty and known payload polynomials in response to said first signal value being within the area bounded by said polynomials, and extrapolates beyond said polynomials in response to said first signal value being outside of the area bounded by said polynomials.

14. A method, as set forth in claim 7, wherein said vehicle further includes a lift arm, said lift arm being pivotally attached to said vehicle by a rotatable pivot pin, whereby said lift cylinder extension sensing step includes sensing rotation about said rotatable pin.

15. A method, as set forth in claim 7, wherein said payload weight calculation step includes compensating for variable cylinder extension velocity by linearly shifting said second order polynomials.

16. An apparatus for dynamically measuring and indicating payload weight for a vehicle having at least one implement linkage, and at least one cylinder for modifying said implement linkage geometry, said apparatus comprising:
  means for delivering a first signal in response to sensing the hydraulic pressure of said cylinder;
  means for delivering a second signal in response to sensing said linkage geometry with respect to said vehicle;
  means for deriving payload weight in response to said first and second signals; and
  wherein said payload weight deriving means produces first and second reference payload parabolic curves, receives said first and second signals, and calculates an actual payload parabolic curve by interpolating between said first and second reference payload curves in response to said first signal value being within the area bounded by said reference payload curves, and by extrapolating beyond said first and second reference payload curves in response to said first signal value being outside of the area bounded by said reference payload curves.

17. The apparatus, as set forth in claim 16, wherein said payload weight deriving means calculates said first and second reference payload curves in response to measuring first and second reference payload weights.

18. The apparatus, as set forth in claim 17, wherein said vehicle includes a payload carrier, said first reference payload weight is the empty weight of said carrier and said second reference payload weight is the weight of said carrier loaded with a predetermined known mass.

19. The apparatus, as set forth in claim 16, wherein each of said payload curves is represented by a second order polynomial equation.

20. The apparatus, as set forth in claim 19, wherein said payload weight driving means compensates for variable cylinder extension velocity by linearly shifting said second order polynomials.

* * * * *

Disclaimer and Dedication 4,919,222—*Christos T. Kyrtsos; Dean A. Worrell*, both of Peoria, Ill. DYNAMIC PAYLOAD MONITOR. Patent dated Apr. 24, 1990. Disclaimer and Dedication filed June 3, 1991, by the assignee, Caterpillar, Inc.

Hereby disclaims and dedicates to the public claims 1 and 2 of said patent.

[ *Official Gazette August 6, 1991* ]